(12) United States Patent
Mueller et al.

(10) Patent No.: US 8,335,229 B1
(45) Date of Patent: Dec. 18, 2012

(54) METHOD FOR SUPPORTING MULTIPLE DEVICES ON A HIGH SPEED PHYSICAL LINK

(75) Inventors: Peter D. Mueller, Fair Oaks, CA (US); Mark N. Fullerton, Austin, TX (US); Nir Nossenson, Kfar-Saba (IL)

(73) Assignee: Marvell International Ltd. (BM)

(*) Notice: Subject to any disclaimer, the term of this patent is extended or adjusted under 35 U.S.C. 154(b) by 0 days.

(21) Appl. No.: 12/700,100

(22) Filed: Feb. 4, 2010

Related U.S. Application Data

(63) Continuation of application No. 10/749,942, filed on Dec. 31, 2003, now Pat. No. 7,668,190.

(51) Int. Cl.
*H04L 12/40* (2006.01)

(52) U.S. Cl. .............. 370/439; 370/447; 700/2; 700/9; 700/20; 710/4; 710/40; 710/110; 710/309

(58) Field of Classification Search .............. 370/433, 370/438, 439, 445, 447; 710/109, 110, 220, 710/260, 261, 262, 263, 264, 265, 266, 267, 710/268, 269; 700/2.3
See application file for complete search history.

(56) References Cited

U.S. PATENT DOCUMENTS

| | | | | |
|---|---|---|---|---|
| 4,504,906 | A | * | 3/1985 | Itaya et al. ............... 710/100 |
| 4,641,237 | A | * | 2/1987 | Yabushita et al. ......... 710/119 |
| 5,303,286 | A | * | 4/1994 | Wiedeman .............. 455/428 |
| 5,434,983 | A | | 7/1995 | Yaso et al. |
| 5,530,875 | A | | 6/1996 | Wach |
| 5,754,780 | A | | 5/1998 | Asakawa et al. |
| 5,784,582 | A | | 7/1998 | Hughes |
| 5,907,689 | A | | 5/1999 | Tavallaei et al. |
| 6,092,137 | A | | 7/2000 | Huang et al. |
| 6,122,690 | A | * | 9/2000 | Nannetti et al. .......... 710/311 |
| 6,279,067 | B1 | * | 8/2001 | Callway et al. .......... 710/260 |
| 7,058,741 | B2 | | 6/2006 | Iwata et al. |
| 2004/0236879 | A1 | | 11/2004 | Croxford et al. |
| 2007/0101033 | A1 | | 5/2007 | Chen et al. |

* cited by examiner

*Primary Examiner* — Bo Hui A Zhu

(57) ABSTRACT

In some embodiments, a method for supporting multiple devices on a high speed physical link may be described. An embedded device may assert a link request pin to request to transmit data on a multi-point communications link that may serve a plurality of embedded devices. A controlling device may receive the link request signal. When the controlling device finishes sending data on the link, it may address the plurality of embedded devices in a round robin format and may determine which device asserted the link request pin. The embedded device that asserted the link request pin may send an acknowledgement signal to the controlling device when it is addressed.

16 Claims, 3 Drawing Sheets

METHOD FOR SUPPORTING MULTIPLE DEVICES ON A HIGH SPEED PHYSICAL LINK

CROSS-REFERENCES TO RELATED APPLICATIONS

This application is a continuation application of commonly-assigned U.S. patent application Ser. No. 10/749,942, filed Dec. 31, 2003 now U.S. Pat. No. 7,668,190, the contents of which are hereby incorporated by reference in its entirety.

BACKGROUND OF THE INVENTION

There are numerous applications for embedded microprocessor devices. These applications may include various technologies for cellular telephones, notebook computers, handheld computers, personal digital assistants, automobiles, appliances and other consumer products. For example, a cellular phone may have an embedded general applications processor and a baseband processor. Typically, the applications processor may manage database applications while the baseband processor may support a communications platform such as General Packet Radio Service (GPRS) or Code Division Multiple Access (CDMA).

The number of microprocessors that are being embedded into devices, particularly handheld devices, is increasing to provide customers with additional features. These new features have increased the types and amounts of data embedded processors exchange with other microprocessors, peripherals and/or external servers. For example, embedded microprocessors now exchange everything from command and control data to large databases and streaming data for voice and video communications.

In the past, if there was a need for inter-processor communications, these communications could be accomplished through a low-speed physical link, such as a serial interface, which may have limited quality of service (QoS) and data reliability management. However, today's designers are integrating new features into handheld devices such as CMOS digital imaging, World Wide Web (WWW) access and multimedia processing. In addition, handheld devices are also supporting more recent communications platforms such as Wideband Code Division Multiple Access (WCDMA), IEEE 802.11, Bluetooth® and the like for next generation wireless applications. This expansion of capabilities has led to the emergence of handheld devices that are structured more like personal computers. For example, these devices might include an applications subsystem for implementing various database and multimedia applications and then separate communications subsystems for implementing wireless communications.

Separate processor subsystems have necessitated an increased focus by circuit designers on high-speed processor to processor communications. Recently, particular attention has been paid to providing a high-speed, reliable standard for a communications interface between an embedded general purpose applications processor and a baseband processor. One example of a high-speed processor to processor communications interface is Intel® Corporation's Mobile Scalable Link® (MSL) technology. Factors considered for an inter-processor communications standard may include high inter-processor data transmission rates, scalability for increasing bandwidth, QoS, security, and the elimination of data exchange bottlenecks. Unlike the typical personal computer, however, these devices have to be designed with severe packaging and power consumption constraints in mind.

BRIEF DESCRIPTION OF DRAWINGS

Embodiments of the present invention may be understood more fully from the detailed description given below and from the accompanying drawings of embodiments of the invention which, however, should not be taken to limit the invention to the specific embodiments described, but are for explanation and understanding only.

DETAILED DESCRIPTION OF THE INVENTION

In, the following detailed description of the present invention numerous specific details may be set forth in order to provide a thorough understanding of embodiments of the present invention. However, it will be apparent to one skilled in the art that the present invention may be practiced without these specific details. In other instances, well-known structures and devices may be shown in block diagram form, rather than in detail, in order to avoid obscuring the present invention.

Reference in the specification to "one embodiment" or "an embodiment" may mean that a particular feature, structure, or characteristic described in connection with the embodiment may be included in at least one embodiment of the invention. The appearances of the phrase "in one embodiment" in various places in the specification are not necessarily all referring to the same embodiment.

The apparatuses presented herein are not inherently related to any particular device, circuit or other apparatus. Various general purpose devices or circuits may be used with the apparatuses in accordance with the teachings herein, or it may prove convenient to construct a more specialized apparatus or device to use in conjunction with the apparatuses. In addition, embodiments of the present invention may not be described with reference to any particular device, circuit or other apparatus. It will be appreciated that a variety of devices, circuits or other apparatuses may be used in conjunction with the apparatuses as described herein.

Figure 1:
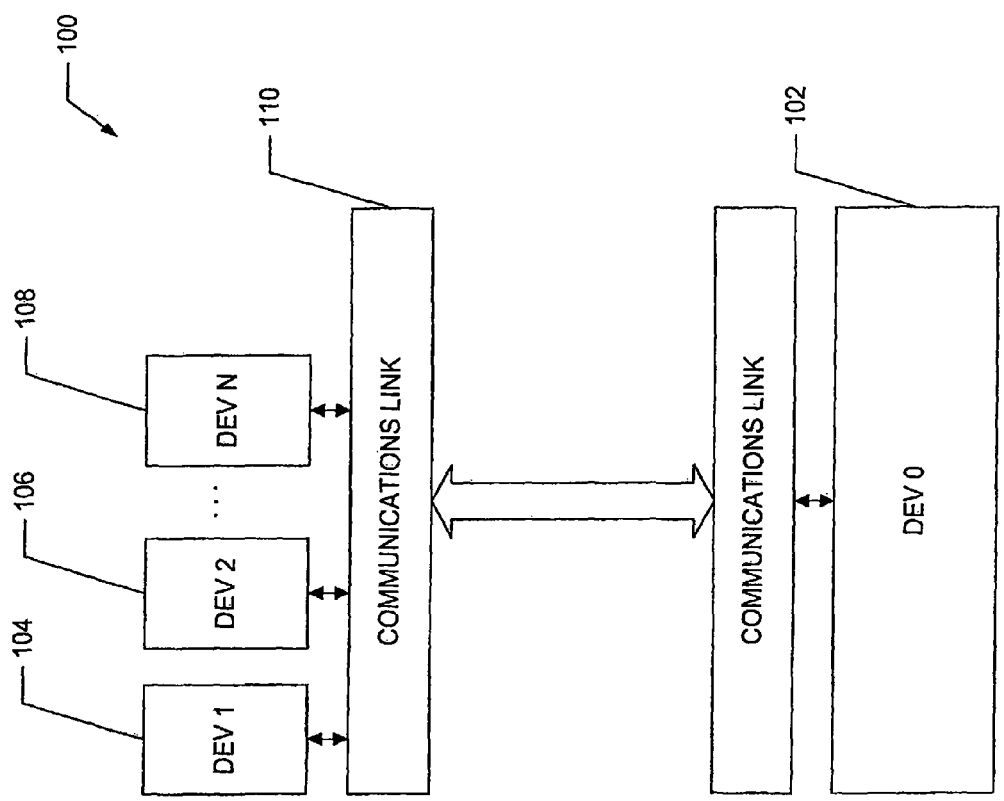
FIG. 1 illustrates an inter-processor communications link.

Referring now to FIG. 1, an illustration of a system 100 for multi-point communications is presented. Device '0' 102 may be an embedded processor device which may be, for example, a general applications processor for a radio telecommunications device, such as, but not limited to, a radio telephone or a personal digital assistant (PDA). In one embodiment, a general applications processor may be focused on running database applications such as World Wide Web surfing or multimedia processing. Device '1' through device 'N', 104, 106 and 108 respectively, may be embedded processor devices. These embedded devices may include a general applications processor device, a baseband processor device or other general or dedicated processor devices. For example, the system 100 may represent a baseband processor to applications processor interface for a "smart" radio telephone medium. The smart telephone may include separate applications and communications subsystems, wherein, for example, the applications subsystem might be represented by device '0' 102 and various communications subsystems may by represented by devices '1'-'N', 104 to 108 respectively. In one embodiment, the communications subsystems may include multiple baseband processors such as CDMA processors, WCDMA processors, Bluetooth processors, IEEE 802.11 processors and/or other baseband processor devices. In one embodiment, the communications subsystems may include processors for multiple cellular basebands for supporting various cellular transmission standards. In another embodiment, the devices '1'-'N', 104 to 108 respectively, may also comprise processors for hardware accelerator applications, audio code/decode (CODEC) applications, digital signal processing and/or other applications.

In one embodiment, the multi-point, inter-device communications link 110 may be a data link between a plurality of applications and/or communications subsystems. For example, the link 110 may be a dedicated and optimized high speed interface that allows for multi-point data transmissions between a plurality of embedded applications processor devices. One inter-device communications link 110 that may be suitable for performing the functions described herein is the Intel® Corporation's Mobile Scalable Link® (MSL) technology, however, this link is not limited to such inter-device communications link. As such, other inter-device communications links capable of, for example, one hundred megabit/second or greater data rates and for providing a common, multi-point interface for communicating between embedded applications processors, may be suitable for performing the functions herein.

Figure 2:
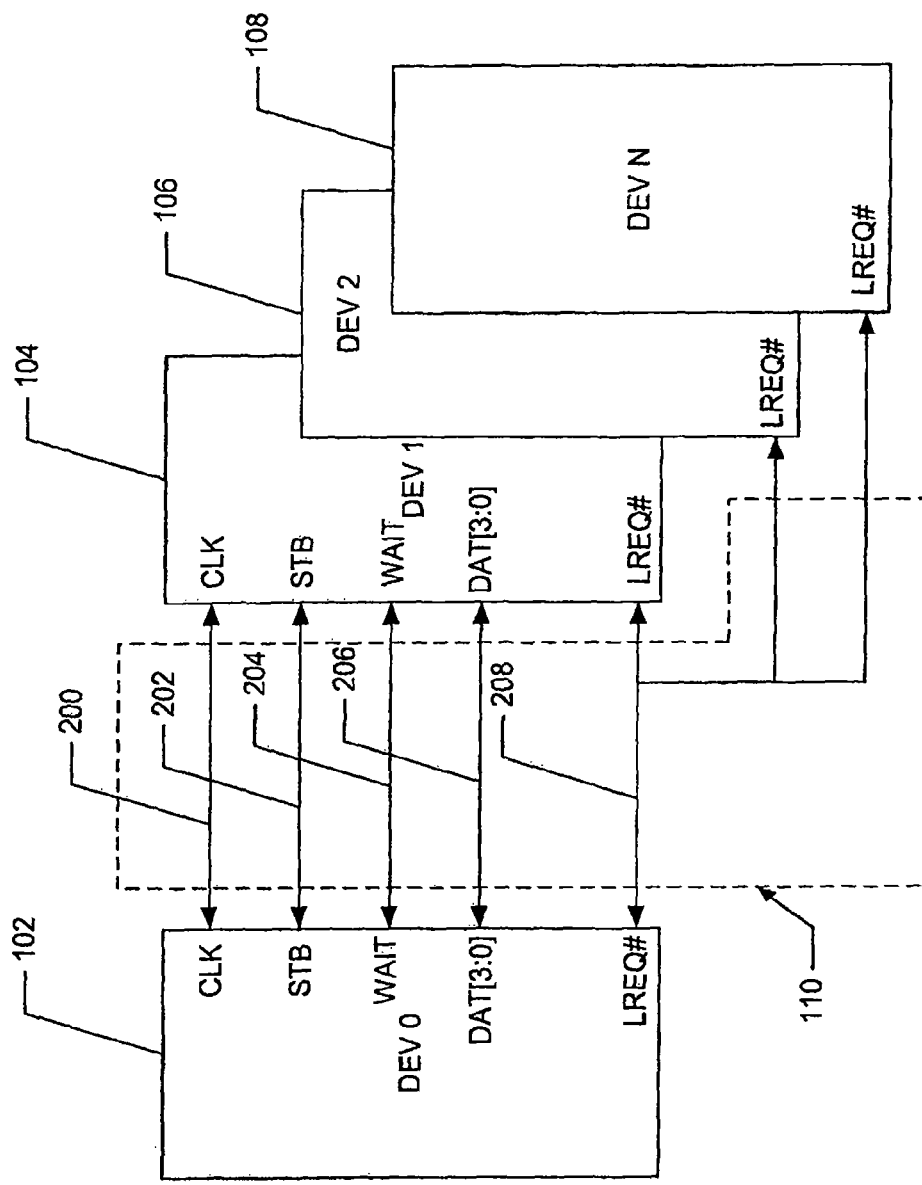
FIG. 2 illustrates an inter-processor communications link according to one embodiment of the present invention.

FIG. 2 illustrates a multi-point, inter-device communications link 110 according to one embodiment of the present invention. In one embodiment, device '0' 102 may represent an applications processor. For example, device '0' 102 may initially control the flow of data on the link 110 between the embedded devices or may be operable to configure the other embedded devices. The clock pin 200 may be activated to control the timing for a data transmission on the link 110. For example, in a handheld device where power conservation may be an issue, the clock 200 may be driven only when data is being transferred on the link 110. Strobe 202 may be activated to frame a data packet so as to tell a receiving device when a packet is coming and the channel that it will be transmitted over. For example, when the strobe 202 is activated, the receiving device may know to look at the data pins 206, which may tell the receiving device what channel the data may be being transmitted on. For a multi-point communications link 110 for example, the activation of the strobe 202 followed by a device identification indicated by the data pins 206 may be used to transmit which device out of the plurality of embedded devices may be targeted to receive data.

The wait pin 204 may be a data flow control mechanism which the receiving device may assert when it may not accept any more data, thus it may prevent an overrun condition. When the wait pin 204 goes inactive, the sending device may know that it may resume transmitting data to the receiving device. The wait pin 204 may also be used as an acknowledgement signal for a device requesting to transmit data on the link 110, as described below.

The link request (LReq) pin 208 may be an arbitration pin that may be shared between the plurality of embedded devices operable to utilize the link 110. Packaging constraints in a handheld device, for example, may make it advantageous to reduce pin count by multiplexing the LReq pin 208 between the plurality of embedded devices. In another embodiment, each device operable to utilize the link 110 to transmit data may have a dedicated LReq pin 208.

In one embodiment, in order to avoid data corruption, only one device may be permitted to transmit data on the link 110 at a time. Therefore, when a device activates the LReq pin 208, an arbitration may begin to determine the requesting device and may handoff permission to transmit data on the link 110 from the controlling device to the requesting device.

Figure 3:
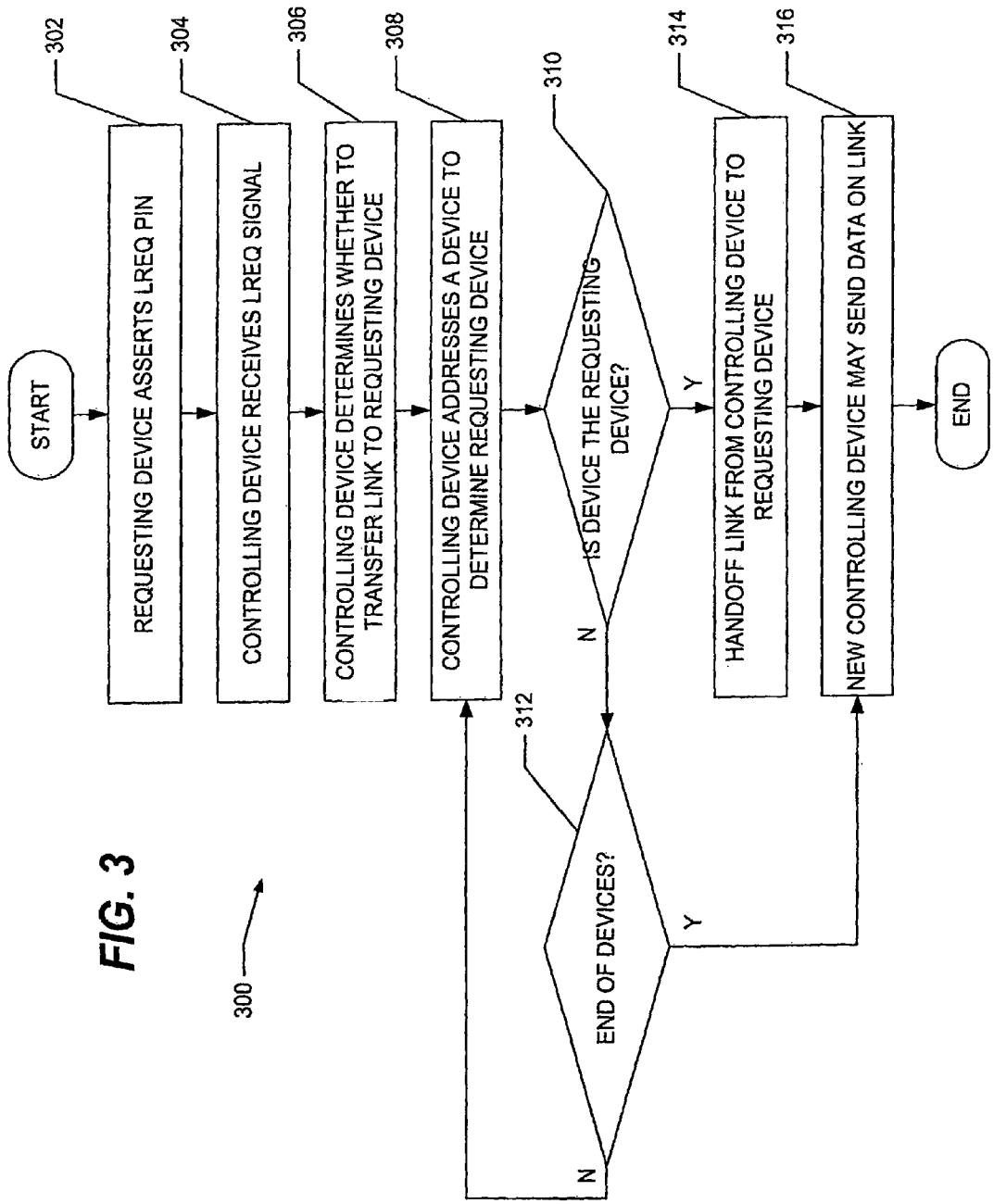
FIG. 3 shows a flowchart illustrating a possible mode of operation of an embodiment of the present invention.

FIG. 3 illustrates a flowchart 300 representing one embodiment of the present invention. In operation, after a start up phase in which a device having permission to transmit data on the link 110 may be established, at 302, a device that may wish to transmit data on the link, or a requesting device, may activate the LReq pin 208. When the LReq pin 208 is activated, the device permitted to transmit on the link, or the controlling device (e.g., sometimes referred to as a "controller" or an "embedded controlling device"), may receive the activated LReq signal at 304 and may begin an arbitration cycle. Alternatively, the controlling device may determine that it does not want to relinquish control of the link 110, for example, if it is still in the process of transmitting data. The controlling device may wait until it is finished transmitting data to begin an arbitration cycle. In one embodiment, the requesting device may not have to reactivate the LReq pin 208 if the controlling device does not immediately begin an arbitration cycle. The LReq pin 208 may stay activated until it is acknowledged by the controlling device.

When the controlling device determines that it is ready to transfer permission to transmit data on the link to another device at 306, the controlling device may address the plurality of embedded devices and may determine which device activated the LReq pin 208 for control of the link 110 at 308. At 310, the controlling device may address each of the plurality of embedded devices and may determine which device activated the LReq pin 208 until it receives an acknowledgement signal. In one embodiment, the controlling device may address the plurality of embedded devices utilizing a round-robin method. For example, if device '1' 104 is the controlling device, it may address device '2' 106 first by activating the strobe pin 202 followed by the device ID for device '2' 106. If device '2' 106 is the requesting device, it may send a confirmation signal to the controlling device. In one embodiment, the requesting device may activate the wait pin 204 when it is addressed by the controlling device as a confirmation signal. If device '2' 106 is not the requesting device, the controlling device may determine whether there are additional embedded devices at 312 and may then address each one in turn 308 and may determine if the addressed device is the requested device. For example, if device '2' 106 is not the requesting device, the controlling device may address a device '3', '4' (not shown) and so on until either the requesting device is found or there are no more devices to address, in which case the controlling device may maintain permission to transmit data across the link 110 at 316. Alternatively, other methods for determining the requesting device, which may be implemented by hardware, software, firmware or any combination thereof, may be implemented by the controlling device. Other methods, including, but not limited to methods which guarantee priority for certain devices when they are the requesting device will be familiar to one who is skilled in the art.

When the requesting device is found by the controlling device, the controlling device may handoff the permission to transmit data on the link 110 to the requesting device at 314. Again, techniques for transferring the control of the data link should also be well known to one skilled in the art. One skilled in the art will find that several handoff techniques may be adequate and equally suitable for implementing the features of the present invention described herein. When the handoff is complete, the new controlling device may be permitted to transmit data on the link 110 at 316.

It should be appreciated that while the present invention may be implemented in many types of electronic devices including radio telephones, personal computers, server computers, hand-held or laptop devices, multiprocessor systems, microprocessor-based systems, set top boxes, programmable consumer electronics, network PCs, minicomputers, mainframe computers and distributed computing environments that include any of the above systems or devices, an exemplary environment for the implementation of the present invention is on a serial communications link that electrically connects embedded CMOS applications microprocessors.

The present invention has been described in relation to particular embodiments, which are intended in all respects to be illustrative rather than restrictive. Alternate embodiments will become apparent to those skilled in the art to which the present invention pertains without departing from its spirit and scope. Accordingly, the scope of the present invention is to be limited only by the claims below.

We claim:

1. A handheld device comprising:
   a plurality of embedded microprocessor devices; and
   an inter-device communication link configured to provide a data link between the plurality of embedded microprocessor devices, wherein at a given time, the plurality of embedded microprocessor devices comprises:
   only one embedded microprocessor device configured as a controlling device that has permission to transmit data on the inter-device communication link; and
   a plurality of non-controlling devices that lack permission to transmit data on the inter-device communication link, each configured to activate a link request pin to request to become the controlling device in order to have permission to transmit data on the inter-device communication link,
   wherein, in response to an activation of the link request pin, the controlling device is configured to:
      initiate an arbitration to determine which one of the plurality of non-controlling devices activated the link request pin to become the controlling device to have permission to transmit data on the inter-device communication link; and
      handoff the permission to transmit data on the inter-device communication link to one of the plurality of non-controlling devices based on the arbitration, and
   wherein, upon handoff, the one of the plurality of non-controlling devices receiving the permission is configured to become the controlling device operable to initiate another arbitration based on a subsequent activation of the link request pin by any of the plurality non-controlling devices,
   wherein the controlling device is configured to initiate the arbitration by being configured to address the non-controlling devices to determine which of the plurality of non-controlling devices activated the link request pin to become the controlling device to have permission to transmit data on the inter-device communication link, and
   wherein the controlling device is configured to address the non-controlling device by being configured to:
   activate a strobe pin and one or more device IDs of the non-controlling devices; and
   receive a confirmation signal from the one of the plurality of non-controlling devices that activated the link request pin.

2. The handheld device of claim 1, wherein the link request pin is shared between the plurality of embedded microprocessor devices.

3. The handheld device of claim 1, wherein the arbitration is performed using a round robin method to determine which one of the plurality non-controlling devices activated the link request pin.

4. The handheld device of claim 1, wherein the inter-device communication link further includes a clock pin configured to be activated to control flow of data on the inter-device communication link.

5. The handheld device of claim 4, wherein the clock pin is driven only when data is being transferred on the inter-device communication link.

6. The handheld device of claim 4, wherein the inter-device communication link further includes a wait pin configured to be asserted by any given non-controlling device in response to the given non-controlling device not being able to accept data from the controlling device.

7. The handheld device of claim 1, wherein the plurality of embedded microprocessor devices includes one or more of a general application processor device, a baseband processor device, a processor for hardware accelerator applications, a processor for audio code/decode (CODEC) applications, or a processor for digital signal processing.

8. The handheld device of claim 7, wherein the baseband processor comprises a Code Division Multiple Access (CDMA) processor, a Wideband Code Division Multiple Access (WCDMA) processor, a Bluetooth processor, or an IEEE 802.11 processor.

9. The handheld device of claim 1, wherein the handheld device comprises a cellular phone, a notebook computer, a handheld computer, or a personal digital assistant.

10. A method for transmitting data between a plurality of embedded microprocessor devices on an inter-device communication link, wherein at a given time, the plurality of embedded microprocessor devices comprises only one embedded microprocessor device configured as a controlling device that has permission to transmit data on the inter-device communication link and a plurality of non-controlling devices that lack permission to transmit data on the inter-device communication link, each configured to activate a link request pin to request to become the controlling device in order to have permission to transmit data on the inter-device communication link, the method comprising:
   any of the plurality of non-controlling devices activating the link request pin to become the controlling device and transmit the data on the inter-device communication link; and
   in response to the activation of the link request pin, the controlling device:
      initiating an arbitration to determine which one of the plurality of non-controlling devices activated the link request pin to become the controlling device to have permission to transmit data on the inter-device communication link; and
      handing off the permission to transmit data on the inter-device communication link to one of the non-controlling devices based on the arbitration,
   wherein, upon handoff, the one of the non-controlling devices receiving the permission is configured to become the controlling device operable to initiate another arbitration based on a subsequent activation of the link request pin by any of the non-controlling devices,
   wherein initiating the arbitration comprises: addressing the non-controlling devices to determine which of the plurality of non-controlling devices activated the link request pin to become the controlling device to have permission to transmit data on the inter-device communication link, and wherein addressing the non-controlling devices comprises: activating a strobe pin and one or more a device IDs of the non-controlling devices; and receiving a confirmation signal from the one of the plurality of non-controlling devices that activated the link request pin.

11. The method of claim 10, wherein the link request pin is shared between the plurality of embedded microprocessor devices.

12. The method of claim 10, wherein the arbitration is performed using a round robin method to determine which one of the plurality of non-controlling devices activated the link request pin.

13. The method of claim 10, wherein: the inter-device communication link includes a clock pin configured to be activated to control flow of data on the inter-device communication link; and the method further includes driving the clock pin only when data is being transferred on the inter-device communication link.

14. The method of claim 10, wherein the plurality of embedded microprocessor devices includes one or more of a general application processor device, a baseband processor device, a processor for hardware accelerator applications, a processor for audio code/decode (CODEC) applications, or a processor for digital signal processing.

15. The method of claim 14, wherein the baseband processor comprises a Code Division Multiple Access (CDMA) processor, a Wideband Code Division Multiple Access (WCDMA) processor, a Bluetooth processor, or an IEEE 802.11 processor.

16. An apparatus comprising:
at a given time, only one embedded microprocessor device configured as a controlling device that has permission to transmit data on an inter-device communication link to a plurality of embedded microprocessor devices that lack permission to transmit data on the inter-device communication link, wherein the controlling device is configured to:
determine an activation of a link request pin by one of the plurality of non-controlling devices, the link request pin being activated by the one of the non-controlling devices to become the controlling device in order to have permission to transmit data on the inter-device communication link; and
in response to determination of activation of the link request pin,
perform an arbitration by addressing the plurality of non-controlling devices to determine which one of the plurality of non-controlling devices activated the link request pin to become the controlling devices to have permission to transmit data on the inter-device communication link; and
handoff the permission to transmit data on the inter-device communication link to the one of the non-controlling devices based on the arbitration,
wherein the controlling device is configured to perform the arbitration by being configured to address the non-controlling devices to determine which of the plurality of non-controlling devices activated the link request pin to become the controlling device to have permission to transmit data on the inter-device communication link, and
wherein the controlling device is configured to address the non-controlling device by being configured to:
activate a strobe pin and one or more device IDs of the non-controlling devices; and
receive a confirmation signal from the one of the plurality of non-controlling devices that activated the link request pin.

* * * * *